US011946538B2

(12) United States Patent
Stephenson et al.

(10) Patent No.: US 11,946,538 B2
(45) Date of Patent: Apr. 2, 2024

(54) TRANSMISSION HEALTH INDICATION AND LIFE PREDICTION

(71) Applicant: Halliburton Energy Serivces, Inc., Houston, TX (US)

(72) Inventors: Stanley Vernon Stephenson, Duncan, OK (US); Joe A. Beisel, Duncan, OK (US); Timothy Holiman Hunter, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 428 days.

(21) Appl. No.: 17/281,812

(22) PCT Filed: Dec. 27, 2018

(86) PCT No.: PCT/US2018/067701
§ 371 (c)(1),
(2) Date: Mar. 31, 2021

(87) PCT Pub. No.: WO2020/139350
PCT Pub. Date: Jul. 2, 2020

(65) Prior Publication Data
US 2022/0010871 A1 Jan. 13, 2022

(51) Int. Cl.
*F16H 57/01* (2012.01)
*G01M 13/022* (2019.01)
(52) U.S. Cl.
CPC .......... *F16H 57/01* (2013.01); *G01M 13/022* (2013.01); *F16H 2057/014* (2013.01)
(58) Field of Classification Search
CPC ............... F16H 57/01; F16H 2057/014; F16H 2061/146; G01M 13/022;
(Continued)

(56) References Cited

U.S. PATENT DOCUMENTS

| 4,805,750 A | 2/1989 | Nitz |
| 5,609,067 A | 3/1997 | Mitchell et al. |

(Continued)

FOREIGN PATENT DOCUMENTS

| CN | 106769075 A | 5/2017 | |
| EP | 2767817 A1 * | 8/2014 | ............. F16H 57/01 |

(Continued)

OTHER PUBLICATIONS

Machine translation of KR2008006236 (cited on the IDS dated Mar. 31, 2021). (Year: 2008).*

(Continued)

*Primary Examiner* — Lori Wu
(74) *Attorney, Agent, or Firm* — DeLizio, Peacock, Lewin & Guerra, LLP

(57) ABSTRACT

To detect the occurrence of slippage, a transmission health monitor integrates speed measurements for an engine shaft and a transmission shaft to determine a number of revolutions for each shaft. The monitor then uses a ratio of the revolutions adjusted for a transmission gear ratio to determine whether slippage has occurred. Based on the slippage, the monitor can determine a cumulative amount of wear on a clutch for each gear and track the rate of change of slippage over time to determine a rate at which wear is occurring. The monitor can also correlate slippage calculations with torque measurements to identify operating conditions at which slippage is occurring. The monitor uses the cumulative amount of slippage, the rate of change of slippage, and the operating conditions at which slippage is occurring to estimate a remaining lifespan for a clutch or indicate that a clutch should be repaired or replaced.

20 Claims, 4 Drawing Sheets

(58) Field of Classification Search
CPC . F16D 2500/30406; F16D 2500/30407; F16D 2500/70276
See application file for complete search history.

(56) References Cited

U.S. PATENT DOCUMENTS

| | | | |
|---|---|---|---|
| 6,125,316 | A | 9/2000 | Sasaki et al. |
| 9,353,857 | B2 | 5/2016 | Waku et al. |
| 2002/0022549 | A1* | 2/2002 | Saito ...................... F16H 61/061 477/154 |
| 2005/0090370 | A1* | 4/2005 | Berger ...................... B60K 6/48 903/917 |
| 2010/0200357 | A1* | 8/2010 | Okabe ................... F16D 48/066 192/30 W |
| 2012/0207493 | A1* | 8/2012 | Asano ...................... F16H 57/01 702/41 |
| 2016/0332629 | A1 | 11/2016 | Dionne et al. |
| 2017/0167557 | A1* | 6/2017 | Han ....................... F16D 66/021 |
| 2020/0040988 | A1* | 2/2020 | Duan .................... F16D 48/066 |

FOREIGN PATENT DOCUMENTS

| | | | |
|---|---|---|---|
| JP | H10196683 | A * | 1/1997 |
| JP | 2003336662 | A | 11/2003 |
| JP | 2007071311 | A * | 3/2007 |
| KR | 20010056933 | A | 7/2001 |
| KR | 20080062236 | A | 7/2008 |
| WO | WO-2010020520 | A1 * | 2/2010 ........... F16D 13/752 |

OTHER PUBLICATIONS

PCT Application Serial No. PCT/US2018/067701, International Search Report, dated Sep. 24, 2019, 3 pages.
PCT Application Serial No. PCT/US2018/067701, International Written Opinion, dated Sep. 24, 2019, 5 pages.

* cited by examiner

TRANSMISSION HEALTH INDICATION AND LIFE PREDICTION

TECHNICAL FIELD

The disclosure generally relates to the field of mechanical engineering, and more particularly to monitoring the operation and health of a transmission.

BACKGROUND ART

Over the life of a transmission, components in the transmission can degrade decreasing the efficiency of the transmission or causing failure. In particular, clutch slippage can occur as clutch discs or other components of the clutch experience wear or in situations when a transmission is experiencing a high load or torque. Clutch slippage is a faulty condition in which there is not enough friction in the clutch causing a loss in engine speed being transferred through the transmission to a load.

BRIEF DESCRIPTION OF THE DRAWINGS

Embodiments of the disclosure may be better understood by referencing the accompanying drawings.

DESCRIPTION OF EMBODIMENTS

The description that follows includes example systems, methods, techniques, and program flows that embody embodiments of the disclosure. However, it is understood that this disclosure may be practiced without these specific details. For instance, this disclosure refers to monitoring a transmission of a pump truck in illustrative examples. Embodiments of this disclosure can be also applied to other engine systems which utilize a transmission and clutch which may experience slippage. In other instances, well-known instruction instances, protocols, structures and techniques have not been shown in detail in order not to obfuscate the description.

Overview

Some systems detect clutch slippage by analyzing a difference in input and output speed of a transmission, often expressed in revolutions per minute (RPM). When comparing speed, however, only high degrees of slippage or gross slippage can be detected since speed sensors are unable to provide enough resolution for detecting minute amounts of slippage. Detecting minute amounts of slippage can aid in detecting degradation of transmission components or conditions which cause slippage. To detect the occurrence of slippage, a transmission health monitor integrates speed measurements for an engine shaft and a transmission shaft to determine a number of revolutions for each shaft. The monitor then uses a ratio of the revolutions adjusted for a transmission gear ratio to determine whether slippage has occurred and a number of slip revolutions. Based on the slippage, the monitor can determine a cumulative amount of wear on a clutch for each gear range and track the rate of change of slippage over time to determine a rate at which wear is occurring. The monitor can also correlate slippage calculations with torque measurements to identify operating conditions at which slippage is occurring. The monitor uses the cumulative amount of slippage, the rate of change of slippage, and the operating conditions at which slippage is occurring to estimate a remaining lifespan for a clutch or indicate that a clutch should be repaired or replaced.

Example Illustrations

Figure 1:
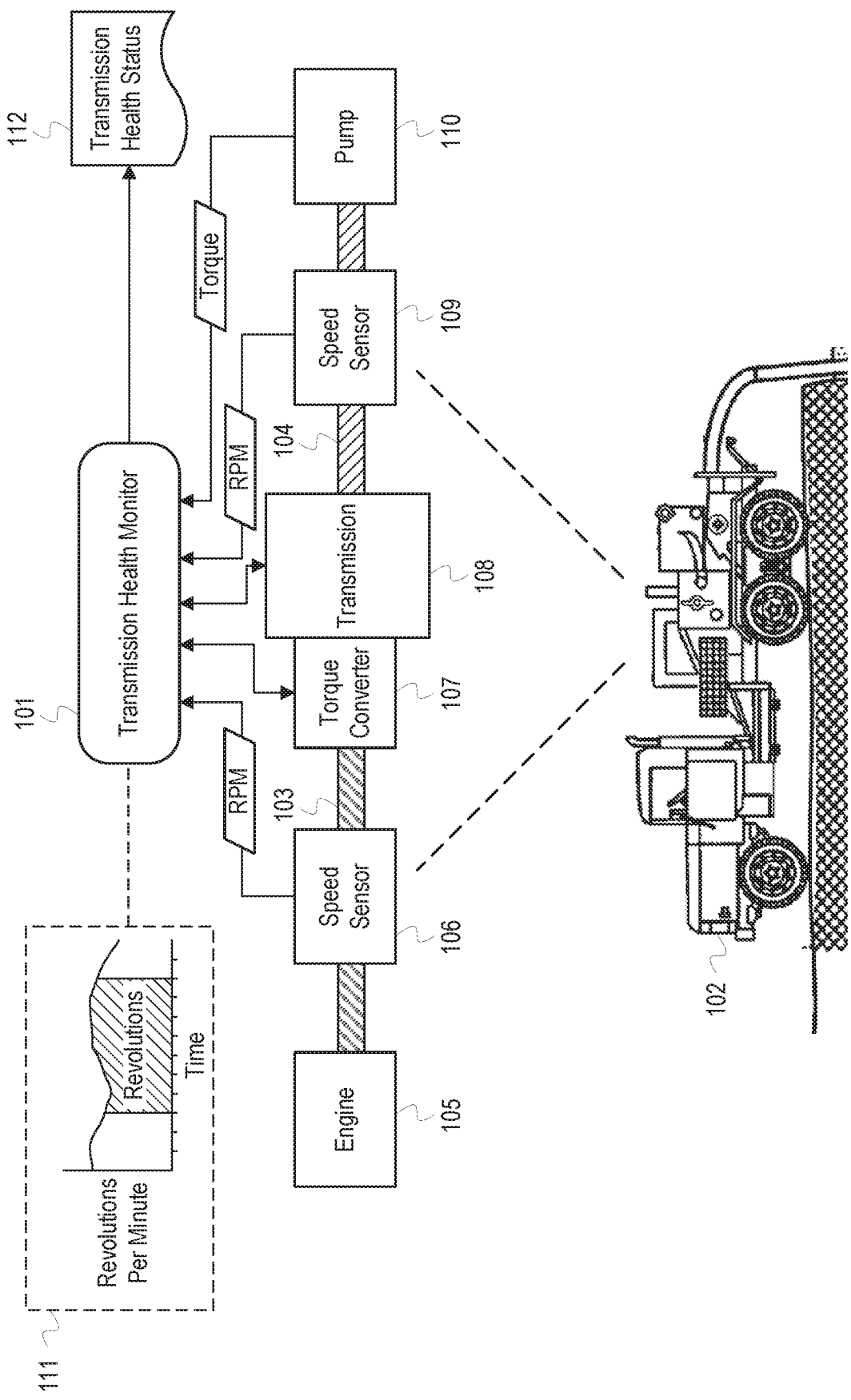
FIG. 1 is a block diagram of a powertrain on a pump truck including a transmission which is monitored to detect clutch slippage.

FIG. 1 is a block diagram of a powertrain on a pump truck including a transmission which is monitored to detect clutch slippage. FIG. 1 depicts a pump truck 102 that includes an engine 105, a speed sensor 106, a torque converter 107, a transmission 108, a speed sensor 109, and a pump 110. An engine shaft 103 monitored by the speed sensor 106 connects the engine 105 to the torque converter 107 and the transmission 108. A transmission shaft 104, sometimes referred to as a tail shaft, is monitored by a speed sensor 109 and connects the transmission 108 to the pump 110. The engine 105 drives the engine shaft 103 which turns gears of the transmission 108 which transfers power from the engine 105 to the transmission shaft 104 and the connected pump 110. The health of the transmission 108 is monitored by a transmission health monitor 101 ("monitor 101") which communicates with or receives information from the speed sensor 106, the speed sensor 109, the torque converter 107, the transmission 108, and the pump 110.

The monitor 101 determines the health of the transmission 108 by determining an amount of clutch slippage for each gear over the lifespan of the transmission 108 and during various operating conditions of the transmission 108. To detect clutch slippage, the monitor 101 compares revolutions of the engine shaft 103 to revolutions of the transmission shaft 104 while the torque converter 107 is in lock-up condition. In general, if the revolutions of the transmission shaft 104 are less than the revolutions of the engine shaft 103 (assuming adjustment for transmission gear ratios), the monitor 101 determines that slippage has occurred (even if the difference is only a partial or fraction of a revolution from the expected revolution value). More specifically, the monitor 101 calculates the number of revolutions of the transmission shaft 104 lost to slippage using the following formula:

$$\text{Slip Revolutions} = \text{Engine Revolutions} - (\text{Transmission Revolutions} * \text{Gear Ratio}) \quad (1)$$

In the above formula, engine revolutions are revolutions of the engine shaft 103, and transmission revolutions are revolutions of the transmission shaft 104. The gear ratio is a ratio of a gear in the transmission 108 which was engaged during a time period for which slip revolutions are being calculated. In the above formula, the calculated slip revolutions represent a number of revolutions of the engine shaft 103 which were not successfully transferred to the transmission shaft 104 due to slippage. Formula (1) is just one example of how a formula for determining slip revolutions may be expressed. For example, another formula could be used which results in the calculation of lost revolutions of the transmission shaft 104 as opposed to the engine shaft 103, such as:

$$\text{Slip Revolutions} = \left(\frac{\text{Engine Revolutions}}{\text{Gear Ratio}}\right) - \text{Transmission Revolutions} \quad (2)$$

The formulas (1) and (2) represent different perspectives for the slip revolutions: one from the engine shaft 103 revolutions and one from the transmission shaft 104 revolutions. Either formula may be used by the monitor 101 so long as the same formula is used consistently for each slip revolution calculation.

To determine revolutions of the engine shaft 103 and the transmission shaft 104, the monitor 101 uses speed data received from the speed sensor 106 and the speed sensor 109. The speed sensors 106 and 109 are positioned to monitor the speed of the engine shaft 103 and the transmission shaft 104, respectively. The speed sensors may be variable reluctance based sensors, hall effect based sensors, eddy current based sensors, etc. The speed sensors output the speeds of the shafts 103 and 104 in revolutions per minute, though other units of measure are possible such as revolutions per second. The monitor 101 receives the RPM measurements from the speed sensors and stores the RPM measurements for each of the shafts as time-series data. To determine total revolutions of the shafts, the monitor 101 integrates the RPM measurements over a time period of interest as illustrated in the graph 111. The graph 111 depicts the RPM measurements received from one of the sensors 106 or 109 plotted over time. The graph 111 also illustrates that integrating speed in RPMs over a time period results in a number of revolutions for the time period. A formula for determining revolutions may be expressed as follows:

$$\text{Revolutions} = \int_{t_1}^{t_2} \text{Revolutions Per Minute } dt \quad (3)$$

where $t_1$ is the start of time period of interest and $t_2$ is the end of the time period. The monitor 101 performs the calculation for both the engine shaft 103 and the transmission shaft 104 RPM measurements.

In some implementations, revolutions of the shafts can be determined by counting gear teeth passing a sensor. The sensor speed sensor 106 may be monitoring teeth of a gear driven by the engine shaft 103, and the speed sensor 109 monitoring teeth of a gear within the transmission 108 or a gear which is driving the transmission shaft 104. The total count of gear tooth passages can be captured from the speed sensors 106 and 109 prior to the signal being processed and converted to RPMs. The number of gear tooth passages is then divided by the total number of teeth on the respective gears to determine how many revolutions (even partial revolutions) have occurred in a given period of time. This method of determining revolutions may be more accurate as it eliminates the change of calibration errors of the speed sensor.

Once the necessary values have been determined, the monitor 101 can utilize formula (1) or (2) shown above to calculate slip revolutions for a time period of interest. For example, assume during a first time period that the engine shaft 103 revolved 1,000 times and the transmission shaft 104 revolved 200 times while engaged in a gear with a gear ratio of 4:1 (i.e., 4 engine shaft 103 revolutions for every 1 transmission shaft 104 revolution):

$$\text{Slip Revolutions} = 1,000 - (200 * 4) = 200 \quad (4)$$

$$\text{Slip Revolutions} = \left(\frac{1,000}{4}\right) - 200 = 50 \quad (5)$$

Example (4) shown above utilizes formula (1) and indicates a number of revolutions of the engine shaft 103 which were not transferred to the transmission shaft 104 due to slippage. Example (5) shown above utilizes formula (2) and indicates a number of revolutions of the of the transmission shaft 104 lost to slippage. A slip revolution value of 0 means that no slippage has occurred and that the transmission 108 and its components are operating at optimum efficiency. A slip revolution value of greater than 0, as shown in the example above, means that slippage has occurred and some efficiency has been lost in transferring power between the engine 105 and the pump 110. As described in more detail below, the monitor 101 tracks the slip revolutions value over time for each gear and different operating conditions to determine the overall health status of the transmission 108 and the health of a clutch for each gear in the transmission 108.

The monitor 101 performs calculations for determining slippage during time periods in which the torque converter 107 is in lock up and the transmission 108 is engaged in a gear range, often referred to as "gear." Although the torque converter 107 and the transmission 108 are depicted as separate components in Figure, the torque converter 107 may be considered to be part of the transmission 108 and may be located within a same housing as the transmission 108. The torque converter 107 is in lock up when a lock-up clutch or other apparatus has been engaged so that there is a 1:1 transfer of revolutions between the engine shaft 103 connected to the torque converter 107 and the transmission 108. When the torque converter 107 is not in lock up, there is a loss of efficiency between the engine shaft 103 and the transmission 108 due to the functionality of the torque converter 107 as it operates to apply torque at lower speeds. This loss of efficiency due to the torque converter 107 would appear as high or gross slippage if slip revolutions were calculated during a period when the torque converter 107 was not in lock up. Similarly, when the transmission 108 is in between gears or not engaged in a gear, the transmission shaft 104 is not being driven in connection with the engine shaft 103, and therefore, slippage calculations would be erroneous. As a result, the monitor 101 calculates slippage during periods when the torque converter 107 is in lock up and the transmission 108 is engaged in a gear so that only slippage predominantly attributable to clutches or other components in the transmission 108 is detected. The monitor 101 or another system can send a signal to the torque converter 107 to cause the torque converter 107 to lock up. Similarly, the monitor 101 or another system can control the transmission 108 and cause the transmission 108 to change/engage a gear. Generally, the torque converter 107 will only be locked up when the transmission is also engaged in a gear so determining whether the torque converter 107 is locked up can be dispositive in determining whether calculations for slippage should be performed.

In some implementations, the monitor 101 determines whether lock up of the torque converter 107 has occurred and whether a gear is engaged by monitoring a difference in RPMs from the speed sensor 106 and the speed sensor 109 to detect gross slippage. Gross or high slippage is slippage which can measure in the hundreds or thousands of revolutions and can therefore be detected using a lower resolution measurement such as RPMs. If the difference in RPMs detected by the speed sensor 106 and the speed sensor 109 is greater than a threshold, the monitor 101 determines that lock up of the torque converter 107 has not occurred or that the transmission 108 is not engaged in a gear. For example, the monitor 101 may use a threshold of 1 RPM, so if the speed sensor 106 is reporting 1,000 RPMs and the speed sensor 109 is reporting 998 RPMs in a gear ratio of 1, the monitor 101 determines that there is gross slippage of 2 RPMs and that either the torque converter 107 is not locked up or the transmission 108 is changing gears. Once the difference in RPMs is less than or equal to 1, the monitor 101 determines that the torque converter 107 is locked up and the transmission 108 is engaged in a gear. In some instances, the transmission 108 or the torque converter 107 may be equipped with a bus or other communication system of a transmission control unit (TCU) which transmits signals indicating a state of the transmission 108 and the torque converter 107. The monitor 101 can be connected to the bus of the TCU to receive signals indicating whether the torque converter 107 is in lock up and whether the transmission 108 is engaged in a gear.

Once the conditions for monitoring slippage (i.e., lock up and engaged gear) have been satisfied, the monitor 101 begins performing calculations to detect slippage. The monitor 101 can calculate slippage for consecutive time windows, e.g., every 30 seconds, 1 minute, 1 hour, etc. The monitor 101 begins the first time window once the conditions for monitoring slippage have been satisfied. The monitor 101 calculates and stores the slip revolutions for each time window until a terminating condition is met. Terminating conditions include the torque converter 107 unlocking, the transmission 108 changing gears, or the engine 105 or the pump 110 halting operation. Terminating conditions may be detected by determining that gross slippage has begun occurring (indicating, for example, that the torque converter 107 is no longer locked up), by sending a signal to the torque converter 107 to unlock, by sending a signal to the transmission 108 to change gears, or by receiving a signal indicating that the engine 105 or the pump 110 has halted operation. Once the terminating condition is received, the monitor 101 stops calculating slip revolutions until the conditions for monitoring slippage are again satisfied. In some implementations, the monitor 101 does not utilize time windows and instead calculates slip revolutions for the entire time period beginning once the conditions for monitoring slippage have been detected and ending once a terminating condition is detected.

The monitor 101 tracks the slip revolutions calculated over the time windows or time periods and can determine a transmission health status 112 based on the total slip revolutions and a rate at which the slip revolutions are increasing. The monitor 101 can plot the slip revolutions over time and determine a rate of increase. If, for example, the slip revolutions are increasing across the time windows at an exponential rate, the monitor 101 indicates in the transmission health status 112 that the health of the transmission 108 is degrading and should be replaced/repaired soon. Since the slip revolutions are determined for each gear, the transmission health status 112 can be indicated on a per gear basis. The monitor 101 can identify gears and their corresponding clutches which may have experienced more slippage and wear than other gears/clutches.

Additionally, the monitor 101 can correlate the slip revolutions with torque measurements received from the pump 110. The monitor 101 can receive torque measurements in time series data from the pump 110 or other monitoring system or may calculate average torque over time windows using hydraulic horsepower and RPM measurements for the pump 110. The monitor 101 correlates the time windows of the slip revolution calculations with time windows for average torque measurements. Using this information, the monitor 101 can determine at which torque levels the transmission 108 is experiencing the most slippage. As described in more detail in FIG. 2, the monitor 101 can track the highest torque at which slippage is occurring over time to determine whether the transmission 108 is experiencing slippage at progressively lower torque loads. The monitor 101 may also correlate the slip revolution values with the torque measurements on a per gear basis. For example, the monitor 101 can indicate that a third gear is experiencing slippage at torque loads above 10,000 foot pounds or Newton meters. The monitor 101 can report the transmission health status 112 in near real time and can indicate whether slippage is occurring at a current load being applied by the pump 110. The real time indication of whether slippage is occurring can aid in determining whether the transmission 108 is being overloaded. Peak torque loads above a rating of the transmission 108 can cause slippage. These peak torque loads or torsional resonances may not be detected in a torque measurement output from a pump 110 or other system as the pump 110 may only output an average torque experienced over a time window. As a result, the average torque measurement may be within the transmission 108 rating for torque loads, but the monitor 101 can determine that torsional resonances or overload conditions are occurring by detecting slippage.

In addition to or in place of the speed sensors 106 and 109 depicted in FIG. 1, other speed sensors can be located at multiple points along the powertrain or within the transmission 108 and the torque converter 107. For example, the transmission 108 may include multiple speed sensors to detect speeds in different sections of the transmission, such as for each gear. Additionally, a speed sensor can be placed to monitor a connection between the torque converter 107 and the transmission 108. Using the measurements from this speed sensor, a lock-up clutch in the torque converter 107 can be monitored for slippage in a manner similar to that described above using formulas (1) and (2). Similarly, measurements from other speed sensors throughout the powertrain can be used to detect malfunction of monitored components. Furthermore, in some implementations, a transmission may be connected to more than transmission shafts such as the transmission shaft 104. Each of these shafts can be similarly equipped with a speed sensor.

Figure 2:
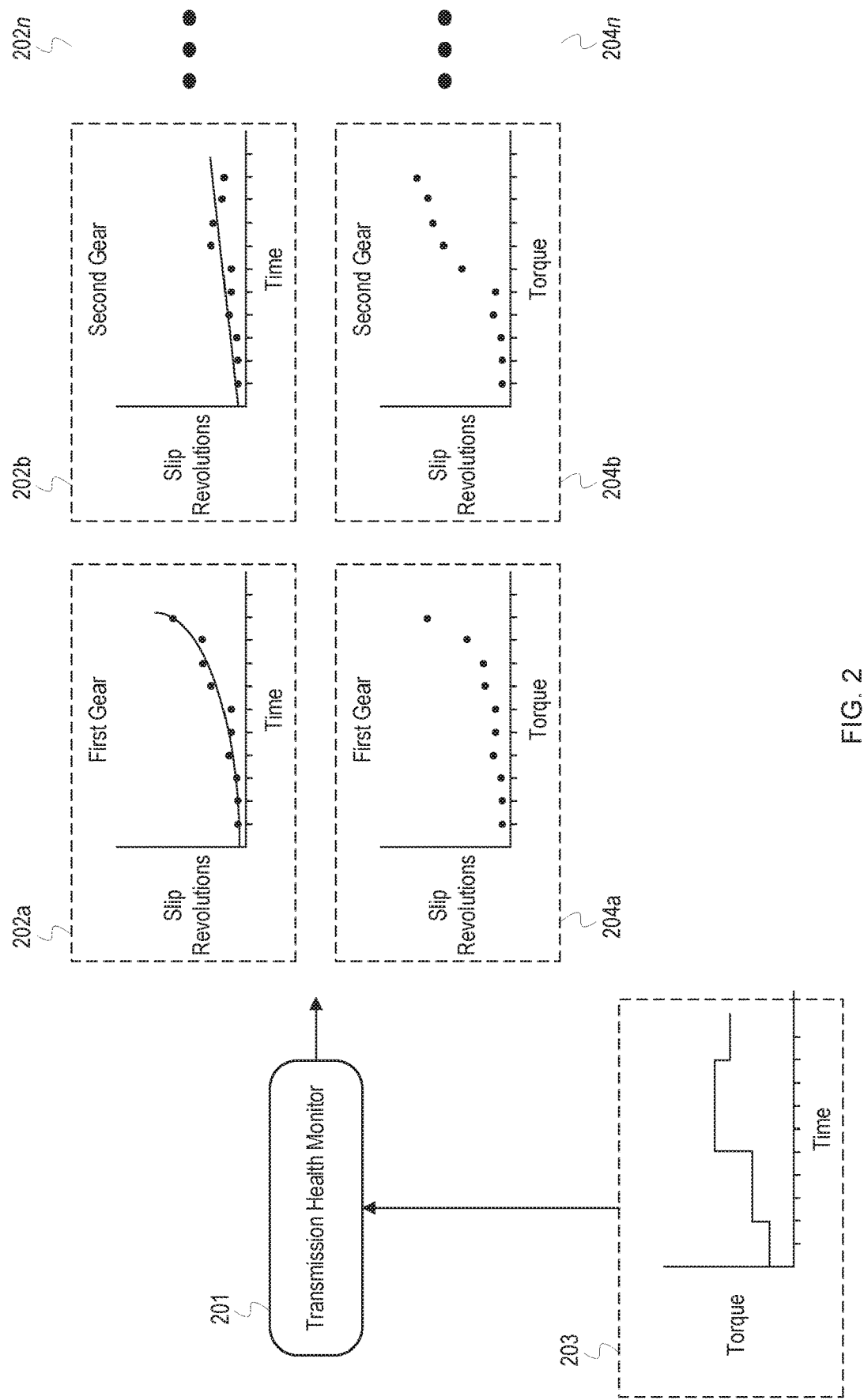
FIG. 2 depicts example outputs of a transmission health monitor for indicating a transmission health status.

FIG. 2 depicts example outputs of a transmission health monitor for indicating a transmission health status. FIG. 2 includes a transmission health monitor 201 which has monitored a transmission to detect slippage as described in FIG. 1 and generated graphs 202 and graphs 204 for indicating the health of the transmission. Although only graphs for a first and second gear are depicted, the graphs 202 and 204 may include additional graphs for each gear of a transmission as indicated by the ellipses referenced by 202n and 204n.

The graphs 202 include a graph 202a presenting slip revolutions detected over time while the transmission was operating in a first gear and a graph 202b presenting slip revolutions detected over time while the transmission was operating in a second gear. The y-axis data points in the graphs 202 represent slip revolutions detected at a corresponding time indicated in the x-axis of the graphs 202. Time can be represented in the graphs 202 in various ways. The time axis may be real time with points corresponding to times of the day at which the slip revolutions were detected. Alternatively, each point along the time axis can represent a time window for which slip revolutions were calculated. Consecutive time windows along the x-axis in the graphs 202 may or may not be consecutive in real time. For example, a first slip revolutions data point for the first gear may be calculated during operation of the transmission in the morning, and the next time window at which slip revolutions are calculated for the first gear may be during operation in the afternoon. These time windows may be adjacent points in the x-axis causing the graphs 202 to present slip revolutions over an operational time or life of the gears of the transmission, as opposed to real time.

As shown in the graphs 202, the monitor 201 can fit a line to the slip revolution data points to illustrate a rate of change of slip revolutions. The graph 202a for the first gear illustrates that the slip revolutions are increasing at an exponential rate. The monitor 201 can generate an alarm or indication that the clutch for the first gear is in a wear state and may need to be replaced soon. Conversely, the second gear, as indicated by the line in the graph 202b, is only exhibiting a linear rate of change for slip revolutions. The monitor 201 can indicate a positive health status for the clutch of the second gear or indicate that the clutch is operating normally.

The monitor 201 also receives torque measurements 203 and correlates the torque measurements 203 with the calculated slip revolutions to generate the graphs 204. The graphs 204 indicate the torques at which slippage is occurring. The monitor 201 can receive the torque measurements 203 as time series data and use timestamps to correlate the torque measurements with timestamps of calculated slip revolutions. As described above, a slip revolution data point may represent all slippage occurring within a time window such as a 30 second window. The 30 second time window can be timestamped with a real time period such as 10:30:15 to 10:30:45. The monitor 201 averages the torque applied over the 30 second window to determine an average torque at which the slippage occurred. After determining an average torque value for each time window, the monitor 201 generates the graphs 204 which depict slip revolutions versus the torque values at which they occurred. Each point in the x-axis for the graphs 204 may represent a range of torques values. For example, one point may represent average torques from 1,000-4,999 and another point from 5,000-10,000. The monitor 201 accumulates the slip revolutions for each range and plots the total slip revolutions for each torque range as data points in the graphs 204.

As additional slippage is detected during operation of the transmission, the monitor 201 continues to update the graphs 204 and tracks whether slip revolutions are increasing at lower torques. For example, as shown in graph 204b for the second gear, slippage is beginning to occur more frequently at progressively lower torques than compared to the graph 204a for the first gear in which slippage is predominantly occurring only at the highest torque range. The monitor 201 also utilizes this information to determine health information for the clutches for each gear and the transmission overall. The monitor 201 can also recommend torques which should be avoided given the likelihood of slippage occurring. For example, the monitor 201 can indicate that applied torques by a pump or other load should be kept below 15,000 foot pounds. In some implementations, the monitor 201 can also control a transmission gear selection to limit operations to lower gears at the higher torques that cause slippage.

Figure 3:
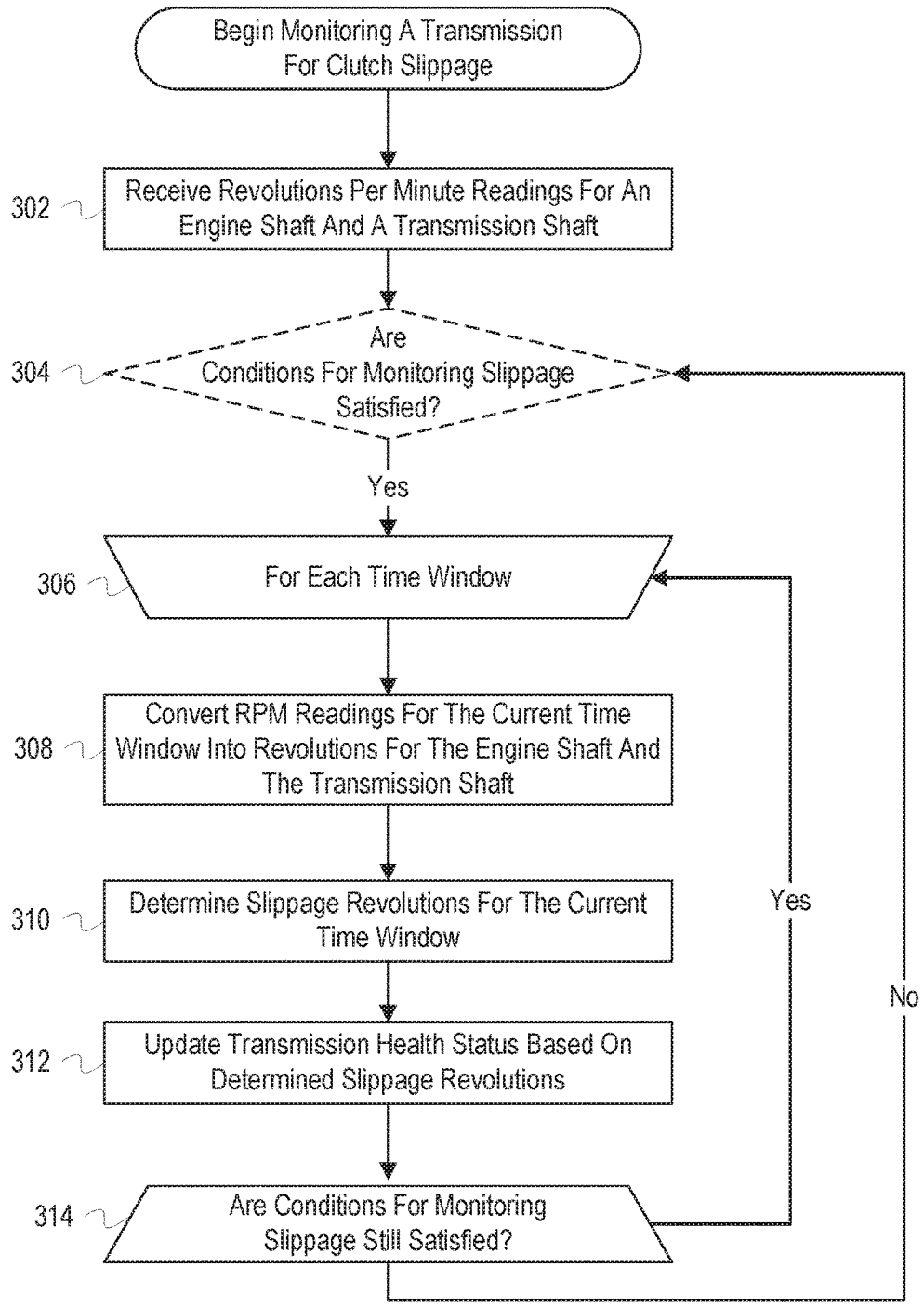
FIG. 3 depicts a flowchart with example operations for monitoring a transmission for clutch slippage.

FIG. 3 depicts a flowchart with example operations for monitoring a transmission for clutch slippage. FIG. 3 describes a transmission health monitor as performing the operations for naming consistency with FIGS. 1 and 2, although the naming of program code can vary among implementations.

A transmission health monitor receives RPM readings for an engine shaft and a transmission shaft (302). The monitor receives the RPM readings for each shaft as time series data and stores the readings in a memory data structure or database. The monitor may also plot the readings in a graph.

The monitor begins determining whether conditions for monitoring slippage are satisfied (304). The monitor waits until a torque converter connected to the transmission is in lock up and the transmission is engaged in a gear before tracking slip revolutions for a transmission. The monitor can determine whether the torque converter is locked up by monitoring a difference in the engine shaft and transmission shaft times gear ratio RPM readings. If there is a difference in the RPM readings greater than a threshold amount, the monitor determines that gross slippage is occurring due to the torque converter not being locked up or due to the transmission being in the process of changing gears. Once the difference in the RPM falls below the threshold, the monitor determines that the conditions for monitoring slippage have been satisfied. In some implementations, the monitor receives signals from a torque converter and a transmission indicating their current status. Once the signals indicate that the torque converter is locked up and the transmission is engaged in a gear, the monitor determines that the conditions are satisfied. As indicated by the dashed line around block 304 in FIG. 3, the monitor can perform the operations of block 304 as a background process while a transmission (or a connected pump or other device) is in operation. Once the conditions for monitoring slippage are satisfied, the monitor proceeds to block 306.

The monitor begins operations for detecting clutch slippage across time windows (306). A first time window begins once the conditions for monitoring slippage are satisfied. Subsequent time windows occur at the expiration of each preceding time window, which may be fixed time intervals such as 5 minutes. The time window for which clutch slippage is currently being determined is hereinafter referred to as "the current time window."

The monitor converts RPM readings for the current time window into revolutions for the engine shaft and the transmission shaft (308). To determine revolutions of each shaft, the monitor integrates the RPM readings over a time period equivalent to a length of the current time window. For example, if the time windows are 1 minute in length and the current time window began at 1:05, the monitor integrates the RPM readings from 1:05 until 1:06. The monitor can perform integration of the RPM readings in a variety of ways. For example, the monitor may perform discrete integration by plotting the data points of the RPM readings and determining the area under the line created by the RPM readings.

The monitor determines slip revolutions for the current time window (310). To calculate slippage for the current time window, the monitor uses the determined revolutions of the engine shaft, the determined revolutions of the transmission shaft, and a gear ratio for a gear in which the transmission is/was engaged during the current time window. The monitor then calculates slippage for the current time window using formula (1) or (2) described above.

The monitor updates a transmission health status based on determined slip revolutions (312). The monitor can plot the determined slip revolutions in a graph, update a value of cumulative slip revolutions, correlate the slip revolutions with an average torque applied over the time window, etc. For example, the monitor may add a data point for the current time window to a graph depicting slip revolutions for the gear in which the transmission is engaged. If slippage greater than a threshold is occurring, the monitor can generate an alarm or notify another system, such as a pump controller or transmission controller, to decrease the load being applied to the transmission typically by dropping to a lower gear. The monitor can also calculate a rate of change using the determined slip revolutions for the current time window and a number of previous time windows. If the rate of change exceeds a threshold, the monitor can similarly generate an alarm or notify another system to reduce the applied load.

After updating the transmission health status, the monitor determines whether conditions for monitoring slippage are still satisfied (314). The monitor may determine that the conditions are no longer satisfied if gross slippage (i.e., slippage above a threshold) has been detected since gross slippage can indicate that the torque converter is no longer locked up. Additionally, the monitor may have received a signal during the current time window indicating that the torque converter is no longer in lock up or that the transmission is changing gears. In either instance, the monitor determines that the conditions are no longer satisfied. If the conditions are still satisfied, the monitor begins determining slip revolutions for a next time window (306). If the conditions are not satisfied, the monitor stops determining slip revolutions and resumes waiting for the conditions to be satisfied (304). If it was determined that gross slippage occurred during the current time window, the monitor may remove the slip revolutions calculated for the current time window from the transmission health status records, as these revolutions may have been due to the torque converter leaving lock up as opposed to clutch slippage.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 308 and 310 can be performed in parallel or concurrently. Block 312 may be performed after block 314 and the transmission health status updated for all time windows for which slippage was calculated. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The examples often refer to a "transmission health monitor." The transmission health monitor is a construct used to refer to implementation of functionality for monitoring a system to detect clutch slippage occurring in a transmission. This construct is utilized since numerous implementations are possible. A transmission health monitor may be firmware on a transmission controller, a particular component or components of a machine (e.g., a particular circuit card enclosed in a housing with other circuit cards/boards), machine-executable program or programs, a circuit card with circuitry configured and programmed with firmware for determining slip revolutions, etc. The term is used to efficiently explain content of the disclosure. The transmission health monitor can also be referred to as clutch monitor, clutch life analyzer, transmission supervisor. Although the examples refer to operations being performed by a transmission health monitor, different entities can perform different operations. For instance, a dedicated co-processor or application specific integrated circuit can convert RPM readings into revolutions.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 4:
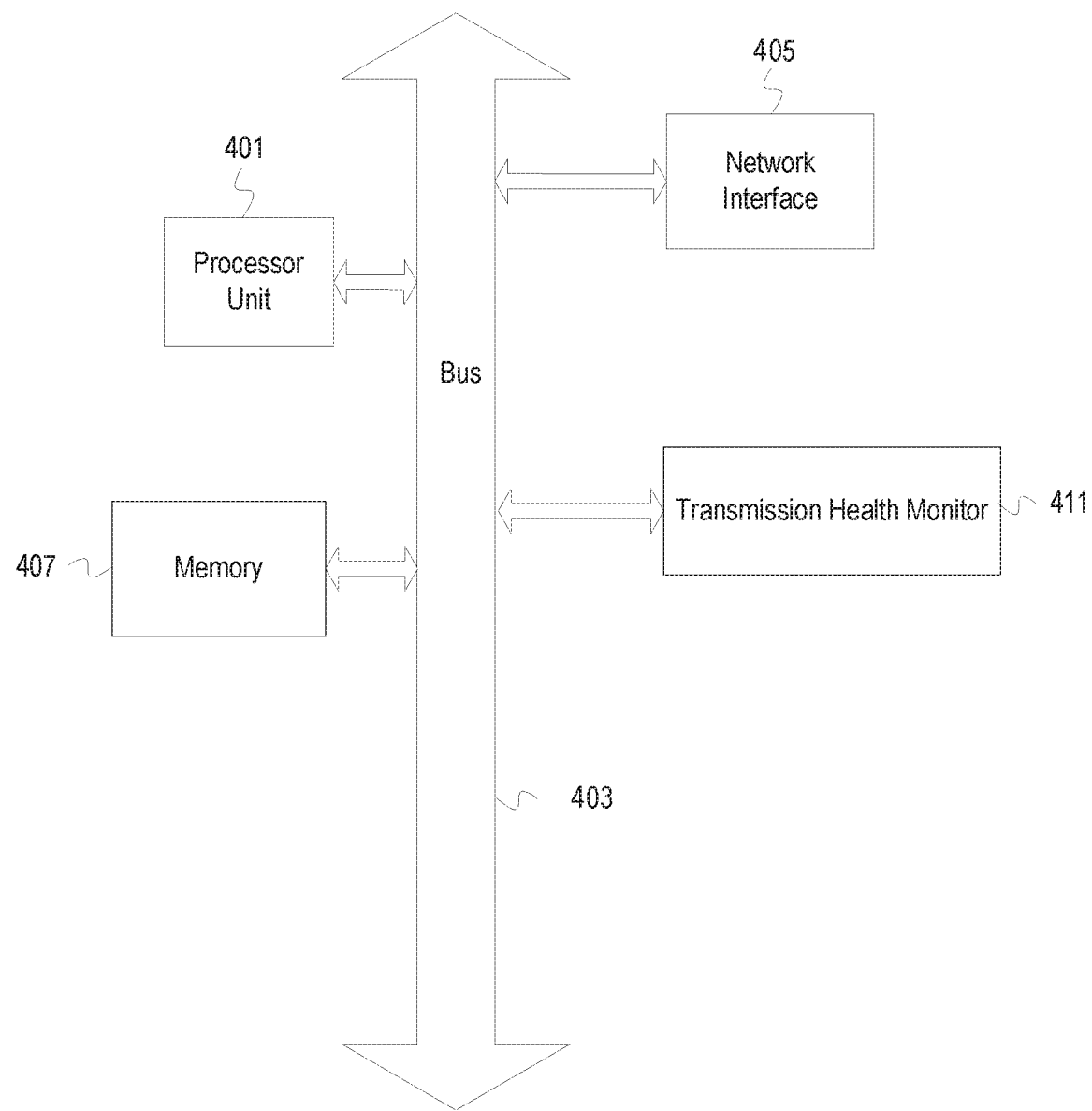
FIG. 4 depicts an example computer system with a transmission health monitor.

FIG. 4 depicts an example computer system with a transmission health monitor. The computer system includes a processor unit 401 (possibly including multiple processors, multiple cores, multiple nodes, and/or implementing multithreading, etc.). The computer system includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 403 (e.g., PCI, ISA, PCI-Express, HyperTransport® bus, InfiniBand® bus. NuBus, etc.) and a network interface 405 (e.g., a Fiber Channel interface, an Ethernet interface, an internet small computer system interface, SONET interface, wireless interface, etc.). The system also includes a transmission health monitor 411. The transmission health monitor 411 detects the occurrence of slippage in a transmission to estimate clutch life for each gear and detect degradation in clutch performance. Any one of the previously described functionalities may be partially (or entirely) implemented in hardware and/or on the processor unit 401. For example, the functionality may be implemented with an application specific integrated circuit, in logic implemented in the processor unit 401, in a co-processor on a peripheral device or card, etc. Further, realizations may include fewer or additional components not illustrated in FIG. 4 (e.g., video cards, audio cards, additional network interfaces, peripheral devices, etc.). The processor unit 401 and the network interface 405 are coupled to the bus 403. Although illustrated as being coupled to the bus 403, the memory 407 may be coupled to the processor unit 401.

While the aspects of the disclosure are described with reference to various implementations and exploitations, it will be understood that these aspects are illustrative and that the scope of the claims is not limited to them. In general, techniques for monitoring health of a transmission as described herein may be implemented with facilities consistent with any hardware system or hardware systems. Many variations, modifications, additions, and improvements are possible.

Example Embodiments

A. A method that includes obtaining first speed measurements for a first shaft and second speed measurements for a second shaft, wherein the first shaft and the second shaft are connected by a transmission; determining, using the first speed measurements and the second speed measurements from a first time window, a number of revolutions of the first shaft and a number of revolutions of the second shaft; calculating, for the first time window, first slip revolutions caused by a first clutch of the transmission based, at least in part, on the number of revolutions of the first shaft and the number of revolutions of the second shaft, wherein the first clutch operates in connection with a first gear range of the transmission; and indicating a health status of the first clutch based, at least in part, on the first slip revolutions.

B. One or more non-transitory machine-readable media comprising program code, the program code to obtain first speed measurements for a first shaft and second speed measurements for a second shaft, wherein the first shaft and the second shaft are connected by a transmission; determine, using the first speed measurements and the second speed measurements from a first time window, a number of revolutions of the first shaft and a number of revolutions of the second shaft; calculate, for the first time window, first slip revolutions caused by the first clutch of the transmission based, at least in part, on the number of revolutions of the first shaft and the number of revolutions of the second shaft; and indicate a health status of the first clutch based, at least in part, on the first slip revolutions.

C. An apparatus that includes a transmission connected to a first shaft and a second shaft; a first speed sensor for obtaining first speed measurements related to the first shaft; a second speed sensor for obtaining second speed measurements related to the second shaft; a first clutch for a first gear range of the transmission; a processor; and a machine-readable medium having program code. The program code is executable by the processor to cause the apparatus to determine, using the first speed measurements and the second speed measurements from a first time window, a number of revolutions of the first shaft and a number of revolutions of the second shaft; calculate, for the first time window, first slip revolutions caused by the first clutch of the transmission based, at least in part, on the number of revolutions of the first shaft and the number of revolutions of the second shaft; and indicate a health status of the first clutch based, at least in part, on the first slip revolutions.

Each of the embodiments A, B, and C may have one or more of the following additional elements in any combination.

Element 1: further comprising calculating, for a second time window, second slip revolutions caused by the first clutch; and determining a rate of change between the first slip revolutions and the second slip revolutions; wherein indicating the health status of the first clutch further comprises indicating the rate of change.

Element 2: further comprising correlating the first slip revolutions with a torque applied during the first time window; wherein indicating the health status of the first clutch further comprises indicating the torque applied during the first time window.

Element 3: further comprising based on determining that the transmission has changed to a second gear range, calculating second slip revolutions caused by a second clutch operating in connection with the second gear range; and indicating the health status of the second clutch based, at least in part, on the second slip revolutions.

Element 4: wherein determining, using the first speed measurements and the second speed measurements from the first time window, the number of revolutions of the first shaft and the number of revolutions of the second shaft comprises integrating the first speed measurements over the first time window to determine the number of revolutions of the first shaft and integrating the second speed measurements over the first time window to determine the number of revolutions of the second shaft.

Element 5: wherein the first slip revolutions are equal to at least one of the number of revolutions of the first shaft minus the number of revolutions of the second shaft multiplied by a gear ratio of the first gear range and the number of revolutions of the first shaft divided by the gear ratio of the first gear range minus the number of revolutions of the second shaft.

Element 6: wherein indicating the health status of the first clutch based, at least in part, on the first slip revolutions comprises updating a cumulative number of slip revolutions over the lifespan of the first clutch with the slip revolutions for the first time window; and indicating the cumulative number of slip revolutions.

Element 7: further comprising determining that a torque converter connected to the transmission is locked up prior to calculating the first slip revolutions.

By way of non-limiting example, exemplary combinations applicable to A, B, and C include Elements 1, 2, and 3 and Element 4 with Element 5.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
   obtaining, over a first time period included within a first time window, a first set of speed measurements for a first shaft and a second set of speed measurements for a second shaft, wherein the first shaft and the second shaft are connected by a transmission;
   determining, for the first time window, a first number value for a first slip revolutions using the first set of speed measurements and the second set of speed measurements adjusted for a ratio of a gear that the transmission was engaged in during the first time window and based on a ratio of a number of revolutions of the first shaft to a number of revolutions of the second shaft over the first time window;
   obtaining, over a second time period included within a second time window, a third set of speed measurements for the first shaft and a fourth set of speed measurements for the second shaft;
   determining, for the second time window, a second number value for a second slip revolutions using the third set of speed measurements and the fourth set of speed measurements adjusted for the ratio of the gear that the transmission was engaged in during the first time window and the second time window and based on a ratio of a number of revolutions of the first shaft to a number of revolutions of the second shaft over the second time window;
   determining a rate of change between the first number value for the first slip revolutions and the second number value for the second slip revolutions; and
   determining a health status for a clutch of the transmission based on the determined rate of change between the first number value and the second number value.

2. The method of claim 1, further comprising:
   correlating the first number value for the first slip revolutions with a torque applied during the first time window; and
   wherein indicating the health status of the clutch of the transmission further comprises indicating the torque applied during the first time window.

3. The method of claim 1, further comprising:
   determining that the transmission has changed to a different gear from the gear the transmission had operated in over the first time window and the second time window;
   determining, for a third time window, a third number value for a third slip revolutions using a fifth set of speed measurements for the first shaft and a sixth set of speed measurements for the second shaft, adjusted for a ratio of the different gear that the transmission was engaged in during the third time window and based on a ratio of a number of revolutions of the first shaft to a number of revolutions of the second shaft over the third time window;
   determining, for a fourth time window, a fourth number value for a fourth slip revolutions using a seventh set of speed measurements and the eight set of speed measurements adjusted for the ratio of the different gear that the transmission was engaged in during the third time window and the fourth time window and based on a ratio of a number of revolutions of the first shaft to a number of revolutions of the second shaft over the fourth time window; and
   determining a health status for a different clutch of the transmission associated with the different gear used to operate the transmission over the third time window and the fourth time window and based on a determined rate of change between the third number value for the third slip revolutions and the fourth number value for the fourth set of slip revolutions.

4. The method of claim 1, wherein determining the number of revolutions of the first shaft over the first time window comprises integrating the first set of speed measurements over the first time window; and
   wherein determining the number of revolutions of the second shaft over the first time window comprises integrating the second set of speed measurements over the first time window.

5. The method of claim 1, wherein the first number value for the first slip revolutions is equal to the number of revolutions of the first shaft over the first time window minus the number of revolutions of the second shaft over the first time window multiplied by the ratio of the gear that the transmission was engaged in during the first time window.

6. The method of claim 1, wherein indicating the health status of the clutch of the transmission further comprises:
   determining a cumulative number of slip revolutions of the clutch occurring over a lifespan of the clutch; and
   estimating a remaining lifespan for the clutch based on the cumulative number of slip revolutions.

7. The method of claim 1, further comprising:
   determining that a torque converter connected to the transmission is locked up prior to calculating the first number value of the first slip revolutions and the second number value for the second slip revolutions over both the first time window and the second time window.

8. The method of claim 1, wherein the first number value for the first slip revolutions is equal to the number of revolutions of the first shaft over the first time window minus the number of revolutions of the second shaft over the first time window multiplied by the ratio of the gear that the transmission was engaged in during the first time window.

9. One or more non-transitory machine-readable media comprising program code, the program code to:
   obtain, over a first time period included within a first time window, a first set of speed measurements for a first shaft and a second set of speed measurements for a second shaft, wherein the first shaft and the second shaft are connected by a transmission;

determine, for the first time window, a first number value for a first slip revolutions using the first set of speed measurements and the second set of speed measurements adjusted for a ratio of a gear that the transmission was engaged in during the first time window and based on a ratio of a number of revolutions of the first shaft to a number of revolutions of the second shaft over the first time window;

obtain, over a second time period included within a second time window, a third set of speed measurements for the first shaft and a fourth set of speed measurements for the second shaft;

determine, for the second time window, a second number value for a second slip revolutions using the third set of speed measurements and the fourth set of speed measurements adjusted for the ratio of the gear that the transmission which was engaged in during the first time window and the second time window and based on a ratio of a number of revolutions of the first shaft to a number of revolutions of the second shaft over the second time window;

determine a rate of change between the first number value for the first slip revolutions and the second number value for the second slip revolutions; and determine a health status for a clutch of the transmission based on the determined rate of change between the first number value and the second number value.

10. The one or more non-transitory machine-readable media of claim 9,
wherein the program code to determine the number of revolutions of the first shaft over the first time window comprises program code to integrate the first set of speed measurements over the first time window; and
wherein determining the number of revolutions of the second shaft over the first time window comprises program code to integrate the second set of speed measurements over the first time window.

11. The one or more non-transitory machine-readable media of claim 9,
wherein the first number value for the first slip revolutions is equal to the number of revolutions of the first shaft over the first time window minus the number of revolutions of the second shaft over the first time window multiplied by the ratio of the sear that the transmission was engaged in during the first time window.

12. The one or more non-transitory machine-readable media of claim 9, wherein the first number value for the first slip revolutions is equal to the number of revolutions of the first shaft over the first time window minus the number of revolutions of the second shaft over the first time window multiplied by the ratio of the gear that the transmission was engaged in during the first time window.

13. An apparatus comprising:
a transmission connected to a first shaft and a second shaft;
a first speed sensor for obtaining a first set of speed measurements related to the first shaft;
a second speed sensor for obtaining a second set of speed measurements related to the second shaft;
a clutch associated with a gear of the transmission;
a processor; and
a non-transitory machine-readable medium having program code executable by the processor to cause the apparatus to, obtain, over a first time period included within a first time window, the first set of speed measurements for a first shaft and the second set of speed measurements for a second shaft;

determine, for the first time window, a first number value for a first slip revolutions using the first set of speed measurements and the second set of speed measurements adjusted for a ratio of the ear that the transmission was engaged in during the first time window and based on a ratio of a number of revolutions of the first shaft to a number of revolutions of the second shaft over the first time window;

obtain, over a second time period included within a second time window, a third set of speed measurements for the first shaft and a fourth set of speed measurements for the second shaft;

determine, for the second time window, a second number value for a second slip revolutions using the third set of speed measurements and the fourth set of speed measurements adjusted for the ratio of the gear that the transmission was engaged in during the first time window and the second time window and based on a ratio of a number of revolutions of the first shaft to a number of revolutions of the second shaft over the second time window;

determine a rate of change between the first number value for the first slip revolutions and the second number value for the second slip revolutions; and determine a health status for the clutch of the transmission based on the determined rate of change between the first number value and the second number value.

14. The apparatus of claim 13, further comprising program code to:
correlate the first number value for the first slip revolutions with a torque applied during the first time window;
wherein the program code to indicate the health status of the clutch of the transmission further comprises program code to indicate the torque applied during the first time window.

15. The apparatus of claim 13, further comprising program code to:
determine that the transmission has changed to a different gear from the gear the transmission had operated in over the first time window and the second time window;
determine, for a third time window, a third number value for a third slip revolutions using a fifth set of speed measurements for the first shaft and a sixth set of speed measurements for the second shaft, adjusted for the ratio of the different gear that the transmission was engaged in during the third time window and based on a ratio of a number of revolutions of the first shaft to a number of revolutions of the second shaft over the third time window;
determine, for a fourth time window, a fourth number value for a fourth slip revolutions using a seventh set of speed measurements and the eight set of speed measurements adjusted for the ratio of the different gear that the transmission was engaged in during the fourth time window and based on a ratio of a number of revolutions of the first shaft to a number of revolutions of the second shaft over the fourth time window; and
determining a health status for a different clutch of the transmission associated with the different gear used to operate the transmission over the third time window and the fourth time window and based on a determined rate of change between the third number value for the third slip revolutions and the fourth number value for the fourth set of slip revolutions.

16. The apparatus of claim 13, further comprising program code to determine the number of revolutions of the first shaft over the first time window comprises program code to integrate the first set of speed measurements over the first time window; and wherein determining the number of revolutions of the second shaft over the first time window comprises program code to integrate the second set of speed measurements over the first time window.

17. The apparatus of claim 13, wherein the first number value for the first slip revolutions is equal to the number of revolutions of the first shaft over the first time window minus the number of revolutions of the second shaft over the first time window multiplied by the ratio of the gear that the transmission was engaged in during the first time window.

18. The apparatus of claim 13, further comprising program code to indicate the health status of the clutch of the transmission further comprises program code to:

determine a cumulative number of slip revolutions of the clutch occurring over a prior lifespan of the clutch; and
estimating a remaining lifespan for the clutch based on the determined cumulative number of slip revolutions.

19. The apparatus of claim 13, further comprising program code to determine that a torque converter connected to the transmission is locked up prior to calculating the first number value of the first slip revolutions and the second number value for the second slip revolutions over both the first time window and the second time window.

20. The apparatus of claim 13, wherein the first number value for the first slip revolutions is equal to the number of revolutions of the first shaft over the first time window minus the number of revolutions of the second shaft over the first time window multiplied by the ratio of the gear that the transmission was engaged in during the first time window.

* * * * *